(12) United States Patent
Latka et al.

(10) Patent No.: US 7,337,967 B2
(45) Date of Patent: Mar. 4, 2008

(54) CHIP CARD MODULE

(75) Inventors: Bettina Latka, Laaber (DE); Frank Puschner, Kelheim (DE); Wolfgang Schindler, Regenstauf (DE); Peter Stampka, Burglengenfeld (DE)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 11/288,990

(22) Filed: Nov. 28, 2005

(65) Prior Publication Data

US 2006/0118642 A1 Jun. 8, 2006

Related U.S. Application Data

(63) Continuation of application No. PCT/DE2004/001035, filed on May 17, 2004.

(30) Foreign Application Priority Data

Jun. 5, 2003 (DE) ................. 103 25 564

(51) Int. Cl.
*G06K 7/10* (2006.01)
(52) U.S. Cl. ............... 235/454; 235/492; 438/253
(58) Field of Classification Search ............ 235/454, 235/476

See application file for complete search history.

(56) References Cited

U.S. PATENT DOCUMENTS 6,076,737 A * 6/2000 Gogami et al. ............ 235/492

6,364,205 B1 4/2002 Janczek et al.
2003/0119221 A1* 6/2003 Cunningham et al. ........ 438/52

FOREIGN PATENT DOCUMENTS

| DE | 196 08 757 A1 | 9/1997 |
|---|---|---|
| DE | 196 25 466 C1 | 11/1997 |
| DE | 196 30 049 A1 | 1/1998 |
| DE | 196 32 814 A1 | 2/1998 |
| DE | 196 40 356 A1 | 3/1998 |
| DE | 198 22 024 A1 | 11/1999 |
| DE | 199 27 051 A1 | 12/2000 |
| DE | 100 35 451 A1 | 2/2002 |
| DE | 100 42 461 A1 | 3/2002 |
| GB | 2 374 831 A | 10/2002 |
| WO | WO-97/33252 A1 | 9/1997 |

OTHER PUBLICATIONS

Kathryn et al. (Compliant bumps for adhesive flip-chip assembly), Components, Packaging, and Manufacturing Technology, Part B: Advanced Packaging, IEEE Transactions on [see also Components, Hybrids, and Manufacturing Technology, IEEE Transactions on], vol. 18, Issue 3, Aug. 1995, pp. 503-510.*

* cited by examiner

*Primary Examiner*—Seung Ho Lee
(74) *Attorney, Agent, or Firm*—Dickstein, Shapiro, LLP.

(57) ABSTRACT

A chip card module having a carrier with contact areas. Arranged on the carrier lying opposite the contact areas is a semiconductor chip, which has an integrated circuit which has on a surface of the chip terminal contacts which are connected in an electrically conducting manner to assigned contact areas. The contact areas have a first conducting layer and a second conducting layer, with cluster elements embedded in the second conducting layer.

13 Claims, 1 Drawing Sheet

CHIP CARD MODULE

CROSS-REFERENCE TO RELATED APPLICATION

This application is a continuation of International Patent Application Ser. No. PCT/DE2004/001035, filed May 17, 2004, which published in German on Dec. 16, 2004 as WO 2004/109591, and is incorporated herein by reference in its entirety.

FIELD OF THE INVENTION

The invention relates to a chip card module comprising a carrier, which has contact areas, a semiconductor chip being arranged on the carrier opposite the contact areas.

BACKGROUND OF THE INVENTION

Chip cards have long been known and are being increasingly used for example as phone cards, identification cards or the like. There are standards which define the dimensions and technical details of such chip cards. ISO 7810 and ISO 7816 are examples of these standards.

At present, chip cards are divided into three categories, contactless chip cards, chip cards with contacts and so-called combi cards. Both the chip cards with contacts and the combi cards have a contact zone, which zones provide contacts in accordance with the aforementioned standards. These contacts are connected to a circuit integrated in the chip card. The arrangement of these contact areas on the chip card is clearly defined by the standards mentioned. The contact zones of the card contacts currently comprise a suitable metallic surface, produced for example from Au, NiPdAg or similar materials. The individual contact areas are separated in an isolating manner from one another by separating channels.

As chip cards become increasingly significant, there is likewise increasing interest in carrying out manipulations on them.

WO 97/33252, for example, discloses a method for verifying the authenticity of documents in the form of chip cards. This is achieved by scanning documents comprising a base material of the chip card with embedded foreign bodies, the physical properties of which differ from those of the base material and are distributed randomly within it, by a detector when they are first issued in at least one scanning track selected by a random generator to detect foreign bodies. After that, the output values of the detector are recorded in a register which is provided in the chip of the chip card and is blocked after an initialization, the stored contents of which register can neither be read nor manipulated from the outside. When the document prepared in this way is used, its foreign body information is constantly read by a detector and buffer-stored in a further register in the chip and compared internally with data on the pattern of the foreign bodies stored in the first register. If the comparison produces a match, the document is released. The disadvantage of this procedure is that the identification, which is based on the assignment of the chip to the card, takes place at a relatively late point in time.

SUMMARY OF THE INVENTION

A chip card module having a carrier, which has contact areas, and a semiconductor chip arranged on the carrier opposite the contact areas. The semiconductor chip has an integrated circuit which has on a surface of the chip terminal contacts which are connected in an electrically conducting manner to assigned contact areas. The contact areas have a first conducting layer and a second conducting layer, with cluster elements being embedded in the second conducting layer.

BRIEF DESCRIPTION OF THE DRAWINGS

The invention is explained in detail below with reference to the drawing, in which.

DETAILED DESCRIPTION OF PREFERRED EMBODIMENTS OF THE INVENTION

The invention is based on an object of providing a chip card module which has individualizing and authenticating properties.

The fact that a conducting layer in which cluster elements are embedded is built up on the contact areas allows, by the random distribution of these elements, the chip card module to be individualized and the module as such to be authenticated already before installation in a card by registering and storing the significant physical properties in the chip that are produced by the cluster elements.

As a result of the fact that the distribution of a physical characteristic variable is stored in the chip, authenticatability is made possible, and can be realized in a simple manner in particular if the reflection factor of the second conducting layer is used as the physical characteristic variable.

Figure 1:
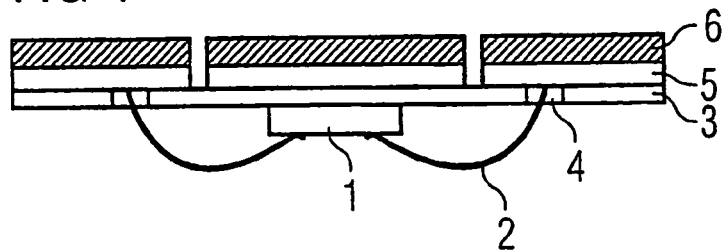
FIG. 1 shows a first exemplary embodiment of the chip card module.

FIG. 1 shows a chip 1, on a carrier 3, which has contact areas 5 on the side facing away from the chip. The chip 1 has an integrated circuit, which is connected to terminal areas formed on the surface of the chip 1. According to the exemplary embodiment as shown in FIG. 1, wire bonding connections lead from these terminal areas through openings 4 in the carrier 3 to the contact areas 5.

Figure 3A:
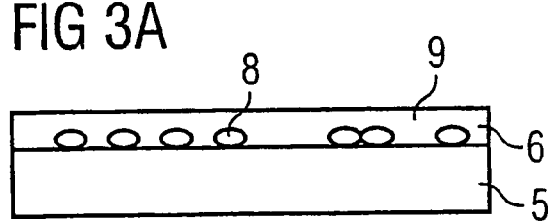
FIGS. 3a to 3c show refinements of the contact areas.
Figure 3B:
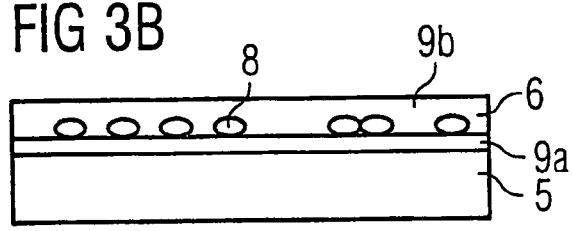
Figure 3C:
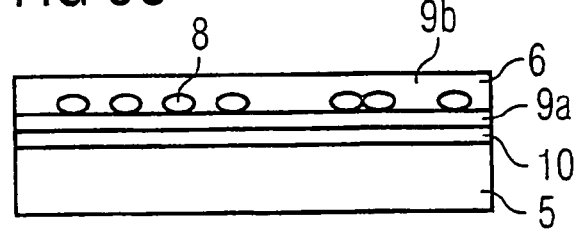

Applied to the surface of the contact areas 5 is a so-called cluster layer, which is explained in refinements according to FIG. 3a to FIG. 3c.

As can be seen in FIG. 3a, individual cluster elements 8 are formed on the surface of the contact areas 5. These elements may consist for example of chromium. These cluster elements 8 are arranged in accordance with a specific pattern or a random distribution. For good and reliable contacting, the cluster elements 8 are then covered by a covering layer 9, which preferably consists of "ITO" (tin-doped indium oxide). As a result of the cluster elements 8, the cluster layer 6 has a specific reflection factor variation when irradiated with light, determined by the individual cluster elements. This is brought about by the interaction between the individual cluster elements 8 and the electrically conducting layer 5.

The fact that a random distribution of the cluster elements 8 makes individualization possible, but the cluster elements can also be arranged in a specific pattern, allows not only individualization but also a desired surface pattern of the contact areas to be produced.

Since the changing of this reflection factor by the cluster elements 8 is determined by the distance of the cluster elements from the electrically conducting layer lying underneath, firstly a layer 9a covering the electrically conducting layer 5 can be applied, on which the cluster elements 8 are then arranged before all of this is covered by the covering layer 9b. It is particularly advantageous if the layers 9a and 9b are produced from the same material, such as "ITO" for example. In a further additional refinement, it is advantageous if an adhesion-promoting layer 10 is arranged on the first conducting layer 5. This is for example chromium, chromium also being advantageous as the material for the cluster elements 8. Further layer materials are likewise titanium and tungsten.

In production, it must be ensured that, to avoid leakage currents between the contacts, the separating trenches between the contacts are covered when the coating is applied. This covering must of course also be removed again after the coating.

For an individualization of the chip card module, it is then firstly necessary to scan at least the individualizing region of the module surface, i.e. for example to irradiate it with light and register in this region the change in the reflection factor in a specific spectral range and store this information in the chip. If the identity or authenticity is to be checked, the current change in the reflection factor within the predetermined limits is determined and compared with the stored data within this individualizing region when the chip card module is used, for example when the chip card with the module is inserted into a reader. If the measured data match the stored data, the identity or authenticity is confirmed.

It may be advantageous if, on the one hand, the data are stored in the chip in an encrypted form and, on the other hand, they are checked in the comparison between the stored values and the measured values only within the chip, so that these data do not leave the chip as such, in order that maximum security against manipulation is obtained.

Figure 2:
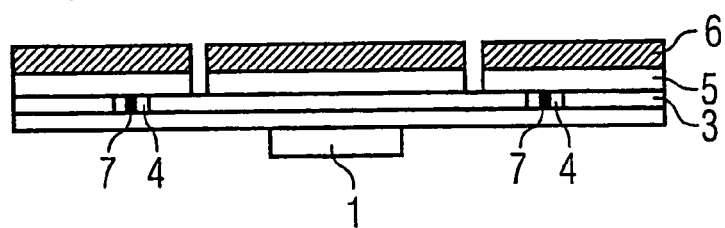
FIG. 2 shows a second exemplary embodiment of the chip card module.

As a departure from the exemplary embodiment represented in FIG. 1, an arrangement according to FIG. 2 is of course possible in the form that the contact areas 5 are not connected to the chip 1 by means of wire bonding connections 2. It is possible equally well that the semiconductor chip is, for example, connected to the carrier 3 by means of a flip-chip connection, an additional refinement generally providing that redistribution routing is formed on the side of the carrier facing the chip, from which contacting 7 to the contact areas 5 is provided in through-openings 4.

Likewise possible is an exemplary embodiment that is not represented, in which the carrier is produced on a metallic material as a so-called leadframe. In the case of this refinement, the contact areas 5 may then be formed directly by the leadframe as the first conducting layer, the cluster layer 6 then being applied directly to the contact areas. Furthermore, it is of course possible to provide an adhesion-promoting layer or, for better conductivity, a gold plating of the surface of the contact areas 5.

What is claimed is:

1. A chip card module comprising:
a carrier, which has contact areas;
a semiconductor chip arranged on the carrier opposite the contact areas, said semiconductor chip having an integrated circuit which has on a surface of the chip terminal contacts which are connected in an electrically conducting manner to assigned contact areas,
wherein the contact areas have a first conducting layer and a second conducting layer, with cluster elements being embedded in the second conducting layer.

2. The chip card module as claimed in claim 1, wherein the embedding of the cluster elements is formed such that the cluster elements lie on the first conducting layer and are covered by the second conducting layer.

3. The chip card module as claimed in claim 1, wherein the embedding of the cluster elements is formed such that the cluster elements are arranged spaced apart from the first conducting layer and completely covered by the second conducting layer.

4. The chip card module as claimed in claim 1, wherein an adhesion-promoting layer is arranged between the first conducting layer and the second conducting layer.

5. The chip card module as claimed in claim 1, wherein an adhesion-promoting layer is formed from chromium, tungsten, or titanium.

6. The chip card module as claimed in claim 1, wherein the second conducting layer is formed from tin doped individual oxide.

7. The chip card module as claimed in claim 1, wherein the cluster elements are formed from chromium.

8. The chip card module as claimed in claim 1, wherein a distribution of physical characteristic variable of the second conducting layer is stored in the chip.

9. The chip card module as claimed in claim 8, wherein the physical characteristic variable is the reflection factor.

10. The chip card module as claimed in claim 8, wherein the physical characteristic variable is the reflection factor of the second conducting layer, applied over the first conducting layer.

11. The chip card module as claimed in claim 1, wherein the cluster elements are arranged in accordance with a specific pattern.

12. The chip card module as claimed in claim 1, wherein the cluster elements are arranged in a random distribution.

13. The chip card module as claimed in claim 1, wherein the semiconductor chip is connected to the carrier via a flip-chip connection.

* * * * *